April 8, 1969  R. E. RIPPLINGER  3,437,827
FLIP-FLOP
Filed May 20, 1965

INVENTOR.
ROLAND E. RIPPLINGER
BY
ATTORNEY

United States Patent Office 3,437,827
Patented Apr. 8, 1969

3,437,827
FLIP-FLOP
Roland E. Ripplinger, Phoenix, Ariz., assignor to General Electric Company, a corporation of New York
Filed May 20, 1965, Ser. No. 457,399
Int. Cl. H02j 1/00, 3/00, 3/14
U.S. Cl. 307—38
14 Claims

ABSTRACT OF THE DISCLOSURE

A pair of silicon controlled rectifiers are cross-coupled to form a flip-flop. A relay prevents both of the silicon controlled rectifiers from conducting at the same time.

---

This invention relates to switching circuits and more particularly to switching circuits of the flip-flop type adapted for the selective switching of current between two loads.

A flip-flop is a bistable multivibrator which operates in either of two stable states. A flip-flop has two signal input terminals, each of which corresponds to one of the two states. The flip-flop remains operating in either state until transferred to the other state by application of a trigger signal to the corresponding terminal. When the flip-flop is in a first state it supplies a predetermined voltage or current to a first output terminal. When the flip-flop is in a second state it supplies a predetermined voltage or current to a second output terminal.

One important application of the flip-flop is for selectively supplying currents to a pair of electrical loads. Such a flip-flop may employ a pair of switching means having a pair of output electrodes and a control electrode. In flip-flops which supply a relatively large current, the switching means may be a pair of silicon controlled rectifiers. The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and the cathode when the pulse of current flows in the gate, the silicon controlled rectifier "fires"; i.e., is rendered conductive, and a current will flow from the anode to the cathode. Once anode-cathode flow commences, the gate has no further control over such current flow. Current flow from anode to cathode in the rectifier can be terminated only by reducing the anode to cathode current below a "holding" or minimum current value. A more detailed description of the operation of a silicon controlled rectifier can be found in the Silicon Controlled Rectifier Manual, Second Edition, 1961, published by the General Electric Company, Auburn, N.Y.

In prior art circuits, a flip-flop employing a pair of silicon controlled rectifiers is used to selectively provide a large current for either of two loads. In one such prior art circuit the first load is a clutch coil and the second load is a brake coil. These coils are employed in an "Endorser Mechanism" disclosed in a U.S. patent application by Donald J. Moschetti et al., filed July 31, 1964, Ser. No. 386,671, which is assigned to the assignee for the present invention. The current supplied to the clutch coil causes a mechanical load to be quickly connected to a rotating shaft of a motor and the current supplied to the brake coil activates a brake to thereby quickly stop the mechanical load. If current were supplied to both the clutch coil and the brake coil at the same time, the speed of the motor shaft would be reduced under the loading of the actuated brake and unless a protective circuit is provided between the motor and a source of electrical current, excessive current could flow through the motor and cause damage to the motor. Thus, in such a circuit, it is important that current be supplied to only one of the coils at any instant of time. As it is possible for both rectifiers to fire at the same time, a circuit is needed which will prevent both of the silicon controlled rectifiers in the flip-flop from conducting at the same time.

The possibility of both of the rectifiers firing simultaneously is the result of the possible presence of electrical noise. If a noise pulse was present at one of the gates at the same time that a signal is applied to the other gate, both rectifiers could be rendered conductive at the same time. This could cause damage to the motor as discussed above.

In some systems it is also important that current be supplied to the first load when power is initially applied to the system. In these systems a circuit is needed which will insure that the switching means provides current to the first load when a supply voltage is initially applied to the flip-flop. The prior art flip-flops have no means for insuring that current be first supplied to the first load.

The present invention alleviates the disadvantages of the prior art by providing a flip-flop having means for insuring that only one of the switching means is conducting at any one time. This flip-flop also has means for insuring that current is always supplied to the first load when power is initially supplied to the system.

It is, therefore, an object of the present invention to provide a circuit to prevent both switching means in a flip-flop from conducting at the same time.

Another object is to provide a circuit to insure that one of the switching means in a flip-flop is rendered conductive when a supply voltage is applied to the flip-flop.

Still another object of this invention is to provide a circuit to insure that a predetermined one of the switching means in a flip-flop is rendered conductive when a supply voltage is initially applied to the flip-flop.

A further object is to provide a circuit to insure that one and only one of the switching means in a flip-flop is rendered conductive when a supply voltage is applied to the flip-flop.

The foregoing objects are achieved in the instant invention, by providing a flip-flop having first and second switching means and an additional switching device having two distinct states of operation. When power is initially applied to the flip-flop the switching device connects the control electrode of the first switching means to a source of power so that the first switching means is rendered conductive. At the same time the switching device disconnects the anode of the second switching means from the source of power to insure that the second switching means does not conduct. When the first switching means starts conducting the switching device disconnects the gate of the first switching means from the source of power and connects the anode of the second switching means to the source of power. The second switching means remains connected to this source of power as long as one and only one of the first and second switching means is conducting. If both switching means should start to conduct at the same time, switching device again disconnects the anode of the second switching means from the source of power. Thus, the present invention insures that a predetermined one of the switching means is rendered conductive when power is initially applied to the flip-flop. The present invention also insures that only one of the switching means conducts at any given time.

Other objects and advantages of the present invention will be apparent from the following specification when taken in connection with the accompanying drawings wherein.

Figure 1:
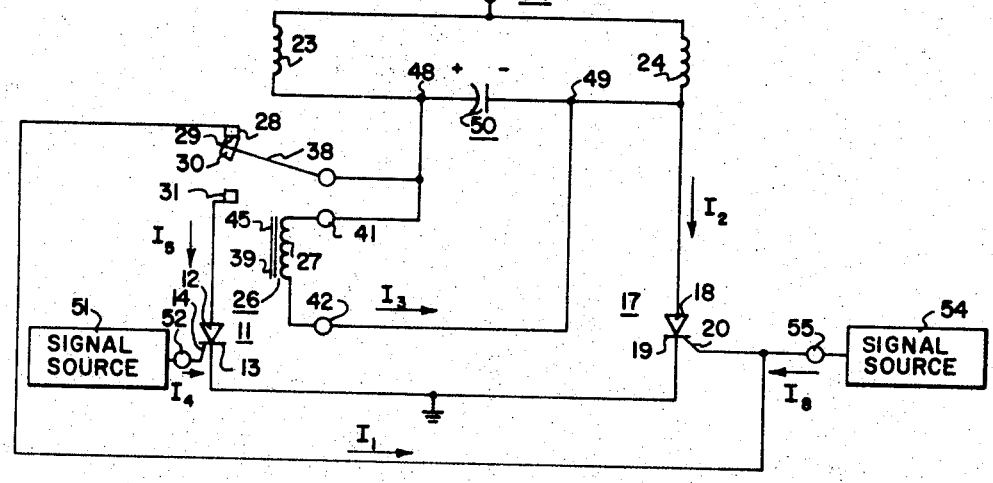
FIG. 1 is a circuit diagram of a first embodiment of the instant invention.

Referring now to FIG. 1 there is shown a flip-flop comprising a pair of switching means 11 and 17. In the illustrated embodiment, the switching means 11 and 17 are silicon controlled rectifiers with rectifier 11 having a first output electrode or anode 12, a second output electrode or cathode 13 and a control electrode or gate 14. Similarly, silicon controlled rectifier 17 includes a first output electrode or anode 18, a second output electrode or cathode 19 and a control electrode or gate 20. The anode circuit of rectifier 11 provides current for a first load 23 such as a brake coil and the anode circuit of rectifier 17 provides current for a second load 24 such as a clutch coil. A switching device or relay 26 having an actuating portion or coil 27 and a set of contacts 28 through 31 connects load 23 to either the anode 12 of silicon controlled rectifier 11 or to the gate 20 of silicon controlled rectifier 17. Load 24 is connected between the anode 18 of silicon controlled rectifier 17 and a power switch 34. Switch 34 is connected to a terminal 36 which is connected to a first reference potential or source of voltage represented by the +6 volts notation in FIG. 1. Load 23 is connected between switch 34 and contacts 29 and 30 of the relay 26 which are mounted on an armature 38. Contact 28 is connected to gate 20 of the silicon controlled rectifier 17, and contact 31 is connected to anode 12 of rectifier 11. When no current flows through coil 27, relay 26 is "deenergized" and contacts 28 and 29 are closed thereby connecting load 23 to gate 20. When current flowing through coil 27 is greater than a particular threshold value, an iron core 39 of the relay 26 is magnetized thereby attracting armature 38 and causing contacts 28 and 28 to open and contacts 30 and 31 to close.

When power switch 34 is initially closed contacts 28 and 29 are closed. Rectifier 17 is rendered conductive by a current $I_1$ which flows from the +6-volt source through load 23, relay contacts 29 and 28, then to the gate 20, to cathode 19 and to a second reference potential represented by ground in FIG. 1. A silicon controlled rectifier has several ohms of internal resistance between the gate and the cathode. In the circuit shown, this internal resistance in rectifier 17 limits the amount of current $I_1$ through load 23 to a value less than the value required to energize the load 23. Current $I_1$ from gate to cathode renders rectifier 17 conductive so that a much greater current $I_2$ flows from the +6-volt source through load 24 from anode 18 and cathode 19 to ground. Current $I_2$ energizes load 24.

When silicon controlled rectifier 17 is rendered conductive, the voltage drop between anode 18 and cathode 19 is approximately +1 volt thus resulting in a 5-volt drop across load 24. Since the current $I_1$ through load 23 is small; the voltage drop across load 23 is small; for example, the voltage drop across load 23 may be 1 volt. Thus, the voltage at a junction point 48 is approximately +5 volts which is 4 volts more positive than the voltage at a junction point 49 so that 4 volts of the polarity shown is developed across a capacitor 50. The difference in voltage across capacitor 50 causes a current $I_3$ to flow from point 48 through coil 27 to point 49. Current $I_3$ through coil 27 energizes the relay so contacts 30 and 31 are closed thereby connecting load 23 to the anode 12 of silicon controlled rectifier 11. The rectifier 11 will not, however, conduct under these conditions until a positive pulse of current is applied to its gate 14.

When a positive pulse of current from a first signal source 51 is applied to a signal terminal 52, a current $I_4$ flows from terminal 52 to gate 14 of silicon controlled rectifier 11, through gate 14 and cathode 13 to ground thereby rendering rectifier 11 conductive. A current $I_5$ flows from the +6-volt source through switch 34, load 23, contacts 30 and 31 to anode 12 and cathode 13 to ground. Current $I_5$ energizes load 23. When rectifier 11 is rendered conductive, the voltage drop between anode 12 and cathode 13 of silicon controlled rectifier 11 is approximately 1 volt with a 5-volt drop across load 23. The +1 volt at anode 12 combined with the 4 volts of the polarity shown across capacitor 50 cause the voltage at anode 18 of silicon controlled rectifier 17 to be a −3 volts. Rectifier 17 no longer conducts due to the negative voltage on anode 18. The voltage at junction point 49 now changes to approximately +6 volts as there is only a small current flowing through load 24 and as a result, there is only a small voltage drop across load 24. Capacitor 50 charges to approximately 5 volts, opposite to the polarity shown in FIG. 1, so that a current $I_6$ not shown, flows from junction point 49 through relay coil 27 to junction point 48 opposite to the direction of $I_3$ shown in FIG. 1. Current $I_6$ energizes the relay and causes contacts 30 and 31 to remain closed.

An alternating current or A.C. type of relay is preferably employed to prevent contacts 30 and 31 from opening during the time the direction of current flow in coil 27 is being reversed. Because of the type of materials used in the core of the relays, an A.C. relay requires a longer duration of time for the armature to change between energized and deenergized positions than is required in a direct current or D.C. relay. Thus, when an A.C. relay is employed with the circuit shown in FIG. 1, current through relay coil 27 can decrease to a zero value and increase to a threshold value in the reverse direction while contacts 30 and 31 remain closed. If a D.C. relay were employed in the circuit of FIG. 1, relay 26 would be deenergized when current through coil 27 decreases to a zero value, the armature 38 would move upward so that contacts 28 and 29 would close and rectifier 17 would again be rendered conductive by gate current $I_1$.

While power switch 34 is closed and the relay 26 is energized, current $I_5$ continues to flow through coil 23 and rectifier 11 until a positive pulse of current from a second signal source 54 is applied to a signal terminal 55 which is connected to the gate 20 of silicon controlled rectifier 17. When a positive pulse of current is applied to terminal 55, a current $I_8$ flows from terminal 55 to gate 20, through gate 20 and cathode 19 to ground thereby rendering rectifier 17 conductive. The voltage at anode 18 of rectifier 17 is now approximately +1 volt. The +1 volt at anode 18 combined with the 5 volts, opposite to the polarity shown in FIG. 1, across capacitor 50 causes the voltage at anode 12 to be a −4 volts and rectifier 11 no longer conducts due to the negative voltage on anode 12. Thus it is seen that each time a positive pulse of current is applied to a signal terminal the corresponding rectifier is conductive until a positive pulse of current is applied to the signal terminal of the other rectifier.

If a positive noise pulse appears on one of the rectifier gates 14 or 20 at the same time that a positive signal is applied to the other gate, both rectifiers are rendered conductive at the same time. However, the voltage at the anode of each conducting rectifier is +1 volt so that the voltage at junction point 48 and junction point 49 are each +1 volt. When these two voltages are the same, no current flows between points 48 and 49 through relay coil 27 and the relay is deenergized to maintain contacts 30 and 31 open. In this condition, no current flows through rectifier 11 and load 23 is deenergized. Thus, the relay circuit prevents load 23 and the load 24 from being energized at the same time.

Figure 2:
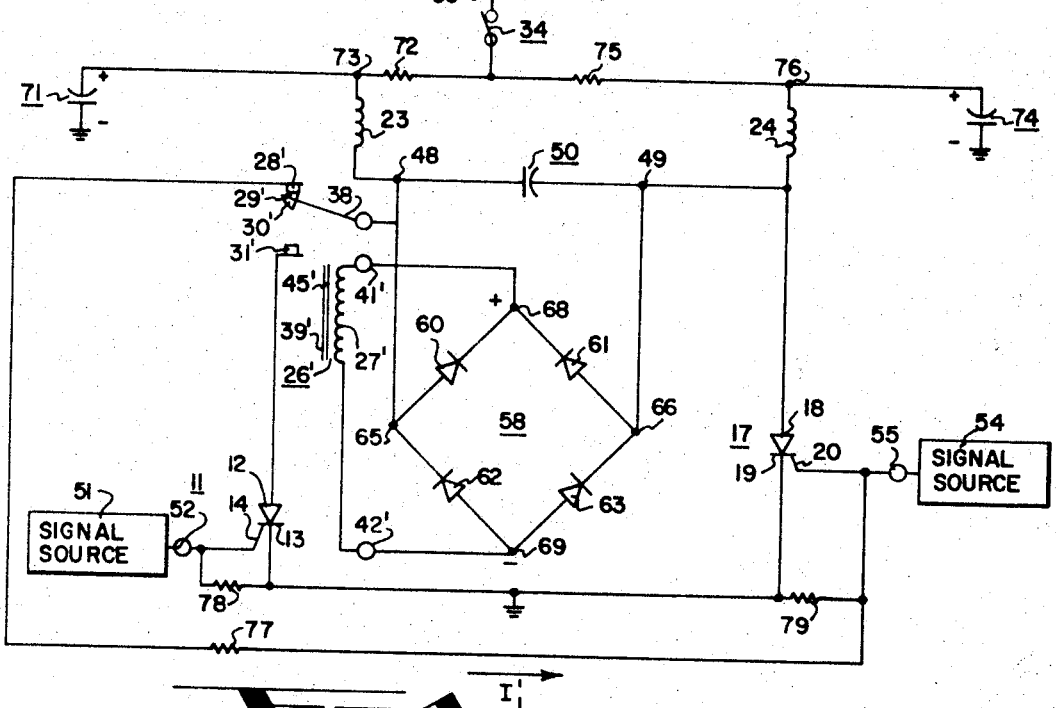
FIG. 2 is a circuit diagram of a second embodiment of the instant invention.

FIG. 2 illustrates a second embodiment of the invention shown in FIG. 1 wherein like parts have similar reference characters. The circuit in FIG. 2 differs from the circuit of FIG. 1 in that it employs additional components which enable the use of a D.C. relay, which as has been stated is faster acting than an A.C. relay, and which thus permits an increase in speed with which the current can be switched between the loads 23 and 24.

Other additional components are provided to aid in preventing the rectifiers from being rendered conductive by noise current in the gate circuits.

To enable the use of the faster D.C. relay, the embodiment of FIG. 2 includes bridge rectifier circuit 58 comprising a plurality of diodes 60–63 to thus provide a direct current through a relay coil 27'. A pair of bridge input terminals 65 and 66 are connected across capacitor 50, and relay coil 27' is connected across output terminals 68 and 69 of the bridge circuit 58 to provide a unidirectional current through the coil 27' regardless of the polarization of the voltage across the capacitor 50.

A further increase in speed may be effected by increasing the voltage at terminal 36. This increased voltage provides an increased voltage across loads 23 and 24 so that current through each load increases more rapidly when the corresponding rectifier is rendered conductive. In the anode circuit of rectifier 11 a capacitor 71, a resistor 72 and an increased voltage applied to terminal 36 provide more rapid energizing of load 23 than is possible in the circuit of FIG. 1. Resistor 72 is connected between switch 34 and load 23 to limit current flow from terminal 36. Capacitor 71 is connected between ground and a junction point 73 which is between resistor 72 and load 12. When rectifier 11 is nonconductive, capacitor 71 charges to approximately 36 volts of the polarity shown. When contacts 30 and 31 are closed and rectifier 11 is rendered conductive, approximately 35 volts is initially applied to load 23 with 1 volt across rectifier 11. Current through load 23 increases much more rapidly than in the circuit of FIG. 1 where the voltage across load 23 is 5 volts when rectifier 11 is rendered conductive. Thus, load 23 is more quickly energized than in the circuit of FIG. 1. In a similar manner, a capacitor 74 and a resistor 75 provide rapid energizing of load 24 when rectifier 17 is rendered conductive. Resistor 75 is connected between switch 34 and load 24 to limit current flow. Capacitor 74 is connected between ground and a junction point 76 which is between resistor 75 and load 24.

The increased voltage at terminal 36 could increase gate current in rectifier 17 and cause damage to the rectifier. To prevent this a resistor 77 (FIG. 2) is employed to limit current $I_1'$ from gate 20 to cathode 19 of silicon controlled rectifier 17 so that the increased voltage at terminal 36 does not increase the gate current sufficiently to cause damage to rectifier 17. A pair of resistors 78 and 79 respectively provide noise protection for rectifiers 11 and 17. For example, when a noise pulse is received at signal terminal 52 of silicon controlled rectifier 11, resistor 78 provides a path for current to flow to ground and reduces the possibility that such a noise pulse would provide sufficient gate-cathode current to render rectifier 11 conductive.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A flip-flop for selectively switching current between first and second loads in response to signals from first and second signal sources, said flip-flop comprising: first and second switching means each having a control electrode and first and second output electrodes; first and second reference potentials; means for connecting said first load between said first potential and said first output electrode of said first switching means; means for connecting said second load between said first potential and said first output electrode of said second switching means, said second output electrodes of said first and second switching means being connected to said second potential; a capacitor; means for connecting said capacitor between the first output electrodes of said first and second switching means; means for coupling said control electrode of said first switching means to said first source; means for coupling said control electrode of said second switching means to said second source whereby a signal from said first source renders said first switching means conductive, and a signal from said second source renders said second switching means conductive; and relay means for insuring that one of said first and second switching means is rendered conductive and the other is nonconductive at any given time.

2. A flip-flop for selectively switching current between first and second loads in response to signals from first and second signal sources, said flip-flop comprising: first and second switching means each having a control electrode and first and second output electrodes; first and second reference potentials; means for connecting said first load between said first potential and said first output electrode of said first switching means; a switching device having an actuating portion and first, second and third terminals, said device being conductive between said first and second terminals when said portion is energized by a current applied to said portion, said device being conductive between said second and said third terminals when said portion is deenergized; means for connecting said second load between said first potential and said second terminal, said first terminal being connected to said first output electrode of said second switching means, said third terminal being connected to said control electrode of said first switching means, said second output electrodes of said first and second switching means being connected to said second potential; a capacitor, said capacitor being connected between said first output electrode of said first switching means and said second terminal of said device, said actuating portion of said device being connected across said capacitor; a first signal input terminal for receiving signals from said first source; and a second signal input terminal for receiving signals from said second source, said first input terminal being connected to said control electrode of said first switching means, and said second input terminal being connected to said control electrode of said second switching means.

3. A flip-flop for selectively switching current between first and second loads in response to signals from first and second signal sources, said flip-flop comprising: first and second switching means each having a control electrode and first and second output electrodes; first and second reference potentials; means for connecting said first load between said first potential and said first output electrode of said first switching means; a relay having a coil, and first, second, third and fourth contacts, said first and second contacts being closed when said coil is energized by a current through said coil, said third and fourth contacts being closed when said coil is deenergized; means for connecting said second load between said first potential and said second and third contacts, said first contact being connected to said first output electrode of said second switching means, said fourth contact being connected to said control electrode of said first switching means, said second output electrodes of said first and second switching means being connected to said second potential; a capacitor, said capacitor being connected between said first output electrode of said first switching means and said second and third contacts, said coil of said relay being connected across said capacitor; a first signal input terminal for receiving signals from said first source; and a second signal input terminal for receiving signals from said second source, said first terminal being connected to said control electrode of said first switching means, and said second terminal being connected to said control electrode of said second switching means.

4. A flip-flop for selectively switching current between first and second loads in response to signals from first and second signal sources, said flip-flop comprising: first and second switching mean each having a control electrode and first and second output electrodes; first and second reference potentials; means for connecting said first load between said first potential and said first electrode of said first switching means; a relay having a coil, and first, second, third and fourth contacts, said first and second contacts being closed when said coil is energized by a current through said coil, said third and fourth contacts being closed when said coil is deenergized; means for connecting said second load between said first potential and said second and third contacts, said first contact being connected to said first electrode of said second switching means, said fourth contact being connected to said control electrode of said first switching means, said second output electrodes of said first and second switching means being connected to said second potential; a capacitor, said capacitor being connected between said first electrode of said first switching means and said second and third contacts; a bridge rectifier circuit having first and second input terminals and first and second output terminals, said capacitor being connected between said first and second input terminals, said coil of said relay being connected between said first and second output terminals; a first signal input terminal for receiving signals from said first source; and a second signal input terminal for receiving signals from said second source, said first signal input terminal being connected to said control electrode of said first switching means, and said second signal input terminal being connected to said control electrode of said second switching means.

5. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; means for connecting said second load between said first potential and said anode of said second rectifier, said cathodes of said first and second rectifiers being connected to said second potential; a capacitor; means for connecting said capacitor between the anodes of said first and second rectifiers; means for coupling said gate of said first rectifier to said first source; means for coupling said gate of said second rectifier to said second source whereby a signal from said first source renders said first rectifier conductive, and a signal from said second source renders said second rectifier conductive; and relay means for rendering said first rectifier conductive prior to said signals being applied to said gates of said first and second rectifiers.

6. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; means for connecting said second load between said first potential and said anode of said second rectifier, said cathodes of said first and second rectifiers being connected to said second potential; a capacitor; means for connecting said capacitor between the anodes of said first and second rectifiers; means for coupling said gate of said first rectifier to said first source; means for coupling said gate of said second rectifier to said second source whereby a signal from said first source renders said first rectifier conductive, and a signal from said second source renders said second rectifier conductive; and relay means for insuring that one of said first and second rectifiers is rendered conductive and the other is nonconductive at any given time.

7. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; means for connecting said second load between said first potential and said anode of said second rectifier, said cathodes of said first and second rectifiers being connected to said second potential; a capacitor; means for connecting said capacitor between the anodes of said first and second rectifiers; means for coupling said gate of said first rectifier to said first source; means for coupling said gate of said second rectifier to said second source whereby a signal from said first source renders said first rectifier conductive, and a signal from said second source renders said second rectifier conductive; means for rendering said first rectifier conductive prior to said signals being applied to said gates of said first and second rectifiers; and relay means for insuring that one of said first and second rectifiers is rendered conductive and the other is nonconductive at any given time.

8. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; a switching device having an actuating portion, and first, second and third terminals, said device being conductive between said first and second terminals when said portion is energized by a current applied to said portion, said device being conductive between said second and said third terminals when said portion is deenergized; means for connecting said second load between said first potential and said second terminal, said first terminal being connected to said anode of said second rectifier, said third terminal being connected to said gate of said first rectifier, said cathodes of said first and second rectifiers being connected to said second potential; a capacitor, said capacitor being connected between said anode of said first rectifier and said second terminal, said actuating portion of said device being connected across said capacitor; a first signal input terminal for receiving signals from said first source; and a second signal input terminal for receiving signals from said second source, said first input terminal being connected to said gate of said first rectifier, and said second input terminal being connected to said gate of said second rectifier.

9. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; a relay having a coil, and first, second, third and fourth contacts, said first and second contacts being closed when said coil is energized by a current through said coil, said third and fourth contacts being closed when said coil is deenergized; means for connecting said second load between said first potential and said second and third contacts, said first contact being connected to said anode of said second rectifier, said fourth contact being connected to said gate of said first rectifier, said cathodes of said first and second rectifiers being connected to said second potential; a capacitor, said capacitor being connected between said anode of said first rectifier and said second and third contacts, said coil of said relay being connected across said capacitor; a first signal input terminal for receiving signals from said first source; and a second signal input terminal for receiving signals from said second source, said first terminal being connected to said gate of said first rectifier, and said second terminal being connected to said gate of said second rectifier.

10. A flip-flop for selectively switching current between first and second loads in response to signals from first and second signal sources, said flip-flop comprising; first and second silicon controlled rectifiers each having an anode, a cathode and a gate; first and second reference potentials; means for connecting said first load between said first potential and said anode of said first rectifier; a relay having a coil, and first, second, third and fourth contacts, said first and second contacts being closed when said coil is energized by a current through said coil, said third and fourth contacts being closed when said coil is deenergized; means for connecting said second load between said first potential and said second and third contacts, said first contact being connected to said anode of said second rectifier, said fourth contact being connected to said gate of said first rectifier, said cathodes of said first and second rectifiers being connected to said second potential; a capacitor, said capacitor being connected between said anode of said first rectifier and said second and third contacts; means for providing a unidirectional current through the coil of said relay in response to a difference in voltage across said capacitor; a first signal input terminal for receiving signals from said first source; and a second signal input terminal for receiving signals from said second source, said first terminal being connected to said gate of said first rectifier, and said second terminal being connected to said gate of said second rectifier.

11. A flip-flop for selectively switching current between first and second loads in response to signals from first and second signal sources, said flip-flop comprising: first and second silicon controlled rectifiers each having an anode, a cathode and a gate; first and second reference potentials; means for connecting said first load between said first potential and said anode of said first rectifier; a relay having a coil, and first, second, third and fourth contacts, said first and second contacts being closed when said coil is energized by a current thorugh said coil, said third and fourth contacts being closed when said coil is deenergized; means for connecting said second load between said first potential and said second and third contacts, said first contact being connected to said anode of said second rectifier, said fourth contact being connected to said gate of said first rectifier, said cathodes of said first and second rectifiers being connected to said second potential; a capacitor, said capacitor being connected between said anode of said first rectifier and said second and third contacts; a bridge rectifier circuit having first and second input terminals and first and second output terminals, said capacitor being connected between said first and second input terminals, said coil of said relay being connected between said first and second output terminals; a first signal input terminal for receiving signals from said first source; and a second signal input terminal for receiving signals from said second source, said first signal input terminal being connected to said gate of said first rectifier, and said signal input second terminal being connected to said gate of said second rectifier.

12. A flip-flop for selectively switching current between first and second loads in response to signals from first and second signal sources, said flip-flop comprising: first and second silicon controlled rectifiers each having an anode, a cathode and a gate; first and second reference potentials; first and second resistors, said first resistor being connected between said first potential and said first load, said first load being connected between said first resistor and said anode of said first rectifier; a relay having a coil, and first, second, third and fourth contacts, said first and second contacts being closed when said coil is energized by a current through said coil, said third and fourth contacts being closed when said coil is deenergized; said second resistor being connected between said first potential and said second load, said second load being connected between said second resistor and said second and third contacts, said first contact being connected to said anode of said second rectifier, said fourth contact being connected to said gate of said first rectifier, said cathodes of said first and second rectifiers being connected to said second potential; first, second and third capacitors, said first capacitor being connected between said anode of said first rectifier and said second and third contacts, said coil of said relay being connected across said first capacitor, said second capacitor being connected between said second potential and a junction point between said first resistor and said first load, said third capacitor being connected between said second potential and a junction point between said second resistor and said second load; a first signal input terminal for receiving signals from said first source; and a second signal input terminal for receiving signals from said second source, said first terminal being connected to said gate of said first rectifier, and said second terminal being connected to said gate of said second rectifier.

13. A flip-flop for selectively switching current between first and second loads in response to signals from first and second signal sources, said flip-flop comprising: first and second silicon controlled rectifiers each having an anode, a cathode and a gate; first and second reference potentials; first and second resistors, said first resistor being connected between said first potential and said first load, said first load being connected between said first resistor and said anode of said first rectifier; a relay having a coil, and first, second, third and fourth contacts, said first and second contacts being closed when said coil is energized by a current through said coil, said third and fourth contacts being closed when said coil is deenergized; said second resistor being connected between said first potential and said second load, said second load being connected between said second resistor and said second and third contacts, said first contact being connected to said anode of said second rectifier, said fourth contact being connected to said gate of said first rectifier, said cathodes of said first and second rectifiers being connected to said second potential; first, second and third capacitors, said first capacitor being connected between said anode of said first rectifier and said second and third contacts, said second capacitor being connected between said second potential and a junction point between said first resistor and said first load, said third capacitor being connected between said second potential and a junction point between said second resistor and said second load; means for providing a unidirectional current through the coil of said relay in response to a difference in voltage across said first capacitor; a first signal input terminal for receiving signals from said first source; and a second signal input terminal for receiving signals from said second source, said first terminal being connected to said gate of said first rectifier, and said second terminal being connected to said gate of said second rectifier.

14. A flip-flop for selectively switching current between first and second loads in response to signals from first and second signal sources, said flip-flop comprising: first and second silicon controlled rectifiers each having an anode, a cathode and a gate; first and second reference potentials; first, second, third and fourth resistors, said first resistor being connected between said first potential and said first load, said first load being connected between said first resistor and said anode of said first rectifier; a relay having a coil, and first, second, third and fourth contacts, said first and second contacts being closed when said coil is energized by a current through said coil, said third and fourth contacts being closed when said coil is deenergized; said second resistor being connected between said first potential and said second load, said second load being connected between said second resistor and said second and third contacts, said first contact being connected to said anode of said second rectifier, said fourth contact being connected to said gate of said first rectifier, said third resistor being connected between said gate and said cathode of said first rectifier, said fourth resistor being connected between said gate and said cathode of said second rectifier, said cathodes of said first and second rectifiers being connected to said second potential; first, second and third capacitors, said first capacitor being connected between said anode of said first rectifier and said second and third contacts; a bridge rectifier circuit having first and second input terminals and first and second output terminals, said first capacitor being connected between said first and second input terminals, said coil of said relay being connected between said first and second output terminals, said second capacitor being connected between said second potential and a junction point between said first resistor and said first load, third capacitor being connected between said second potential and a junction point between said second resistor and said second load; a first signal input terminal for receiving signals from said first source; and a second signal input terminal for receiving signals from said second source, said first terminal being connected to said gate of said first rectifier, and said second terminal being connected to said gate of said second rectifier.

References Cited

UNITED STATES PATENTS

| | | |
|---|---|---|
| 3,113,293 | 12/1963 | Breese et al. |
| 3,229,191 | 1/1966 | Williamson _____ 307—41 X |
| 3,283,206 | 11/1966 | Utt et al. |
| 3,292,035 | 12/1966 | Lee. |

ROBERT K. SCHAEFER, *Primary Examiner.*

T. B. JOIKE, *Assistant Examiner.*

U.S. Cl. X.R.

307—252